United States Patent [19]

Ueda et al.

[11] Patent Number: 5,345,338
[45] Date of Patent: Sep. 6, 1994

[54] ZOOM LENS SYSTEM FOR USE IN A COPYING APPARATUS

[75] Inventors: Toshihiko Ueda, Toyokawa, Japan; Sanae Watanebe, Storrs, Conn.

[73] Assignee: Minolta Camera Kabushiki Kaisha, Osaka, Japan

[21] Appl. No.: 37,284

[22] Filed: Mar. 26, 1993

[30] Foreign Application Priority Data

Mar. 30, 1992 [JP] Japan .................. 4-102368
Apr. 23, 1992 [JP] Japan .................. 4-129408
Apr. 23, 1992 [JP] Japan .................. 4-129409

[51] Int. Cl.$^5$ ............................................ G02B 15/14
[52] U.S. Cl. ................... 359/679; 359/683; 359/684; 359/685; 359/689; 359/686
[58] Field of Search ............ 359/689, 677, 679, 676, 359/684, 685, 683, 686

[56] References Cited

U.S. PATENT DOCUMENTS

| | | | |
|---|---|---|---|
| 4,832,465 | 5/1989 | Arai et al. | 359/679 |
| 5,039,211 | 8/1991 | Maruyama | 359/686 |
| 5,270,864 | 12/1993 | Watanabe | 359/685 |

FOREIGN PATENT DOCUMENTS

| | | | |
|---|---|---|---|
| 1123210 | 5/1989 | Japan . | |
| 0262513 | 10/1989 | Japan | 359/679 |

*Primary Examiner*—Loha Ben
*Assistant Examiner*—Evelyn A. Lester
*Attorney, Agent, or Firm*—Price, Gess & Ubell

[57] ABSTRACT

A zoom lens system for use in a copying apparatus has first, second and third lens units of negative, positive and negative, respectively. Zooming is performed while the conjugate distance is kept constant by varying the distance between the first and second lens units and the distance between the second and third lens units and varying at a magnification either larger or smaller than unity the distance between the second and third lens elements of the second lens unit. The first lens unit has a lens element strongly concave to the object side. The second lens unit has a positive meniscus lens element, a bi-concave lens element and a bi-convex lens element. The third lens unit has a negative meniscus lens element concave to the image side.

6 Claims, 18 Drawing Sheets

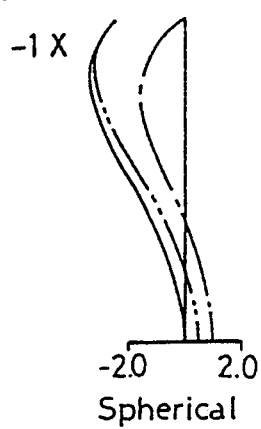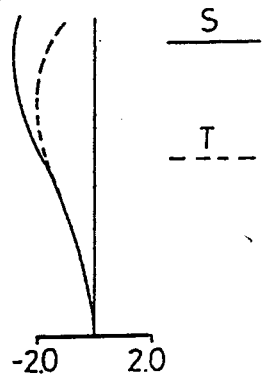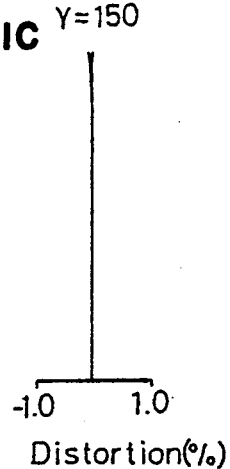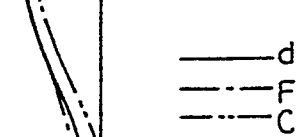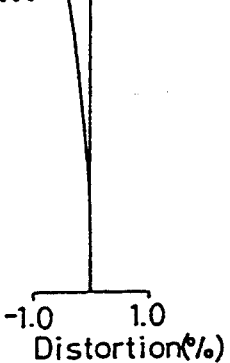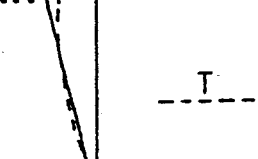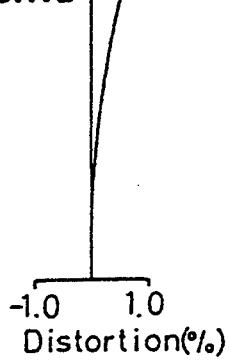

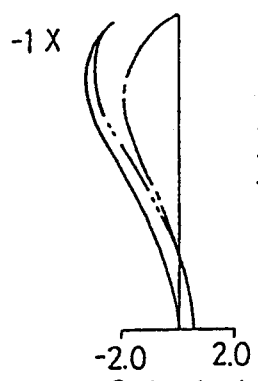
FIG. 12A  F_NO /8  -1X  Spherical aberration  —— d  —·— F  —··— C
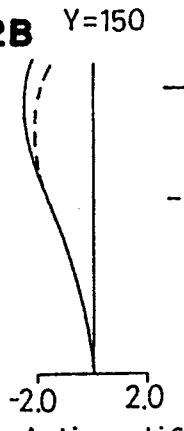
FIG. 12B  Y=150  Astigmatism
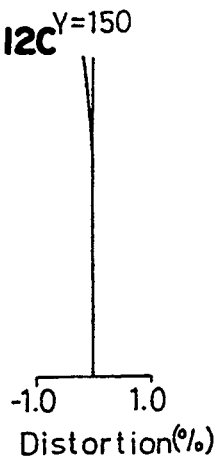
FIG. 12C  Y=150  S ——  T ----  Distortion(%)
FIG. 12D  F_NO /8  -0.5X  Spherical aberration  —— d  —·— F  —··— C
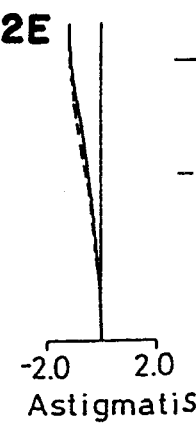
FIG. 12E  Y=75  Astigmatism
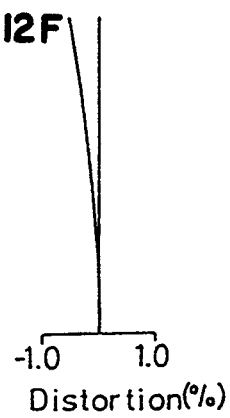
FIG. 12F  Y=75  S ——  T ----  Distortion(%)
FIG. 12G  F_NO /8  -2.0X  Spherical aberration  —— d  —·— F  —··— C
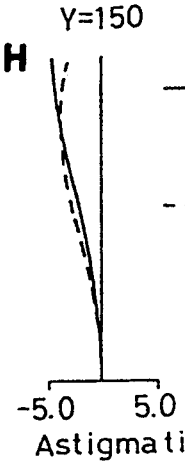
FIG. 12H  Y=150  Astigmatism
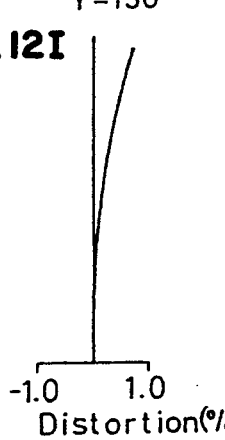
FIG. 12I  Y=150  S ——  T ----  Distortion(%)

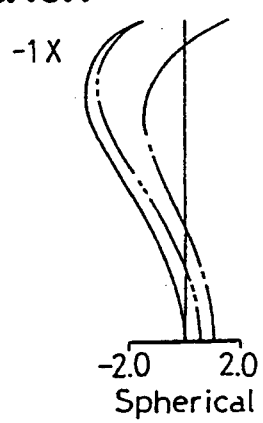
FIG. 13A $F_{NO}$ /8 −1X
Spherical aberration
d, F, C
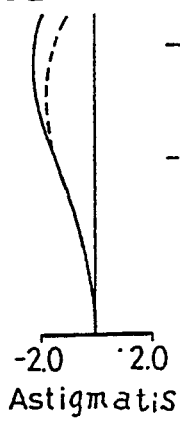
FIG. 13B Y=150
Astigmatism
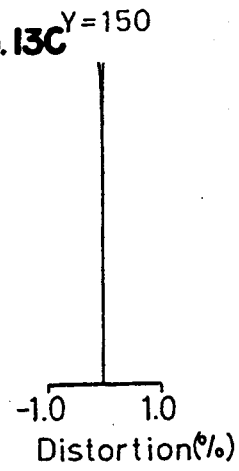
FIG. 13C Y=150
S ———
T - - -
Distortion(%)
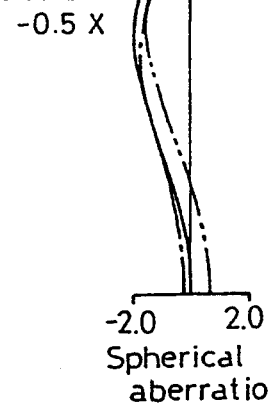
FIG. 13D $F_{NO}$ /8 −0.5X
Spherical aberration
d, F, C
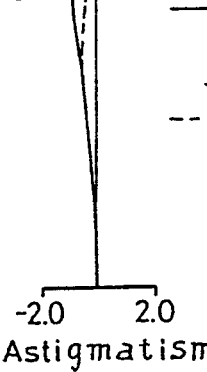
FIG. 13E Y=75
Astigmatism
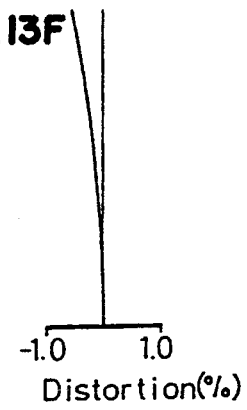
FIG. 13F Y=75
S ———
T - - -
Distortion(%)
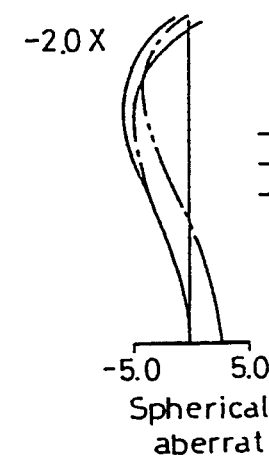
FIG. 13G $F_{NO}$ /8 −2.0X
Spherical aberration
d, F, C
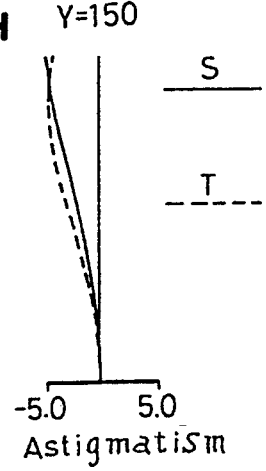
FIG. 13H Y=150
Astigmatism
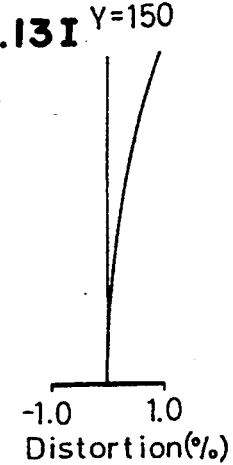
FIG. 13I Y=150
S ———
T - - -
Distortion(%)

FIG. 14A F_NO /8    FIG. 14B Y=150    FIG. 14C Y=150
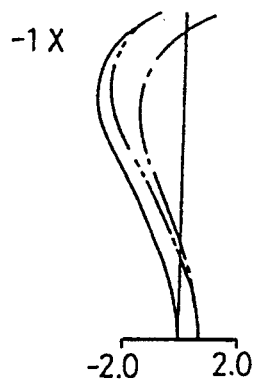
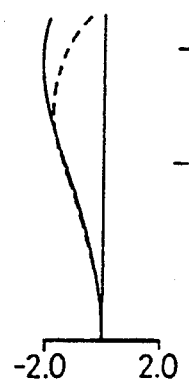
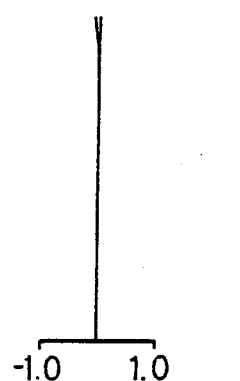
Spherical aberration    Astigmatism    Distortion(%)
FIG. 14D F_NO /8    FIG. 14E Y=75    FIG. 14F Y=75
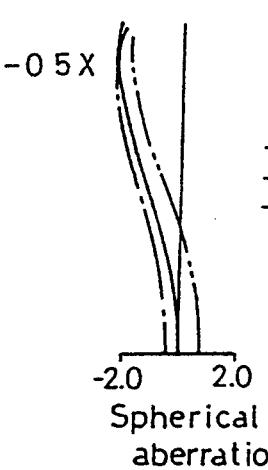
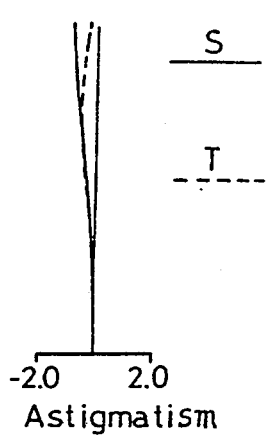
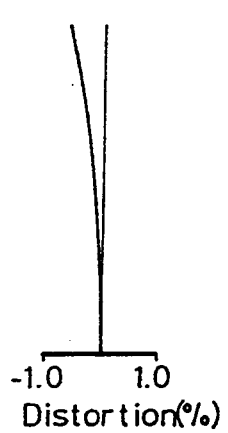
Spherical aberration    Astigmatism    Distortion(%)
FIG. 14G F_NO /8    FIG. 14H Y=150    FIG. 14I Y=150
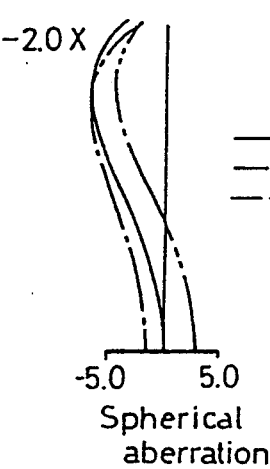
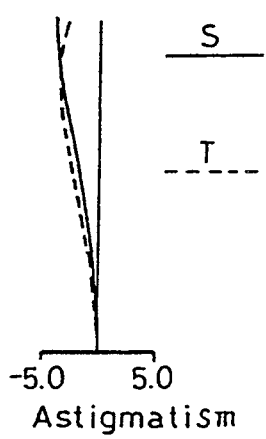
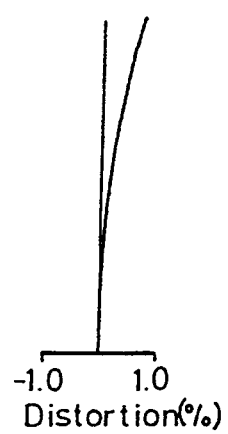
Spherical aberration    Astigmatism    Distortion(%)

FIG. 15A  F_NO/9
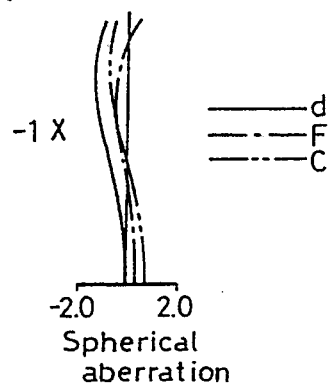
−1 X
−2.0  2.0
Spherical
aberration
—— d
—·— F
—··— C
FIG. 15B  Y=150
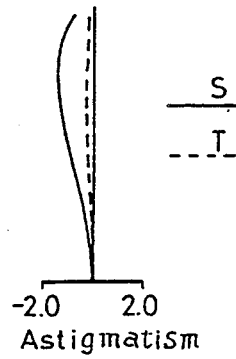
−2.0  2.0
Astigmatism
FIG. 15C  Y=150
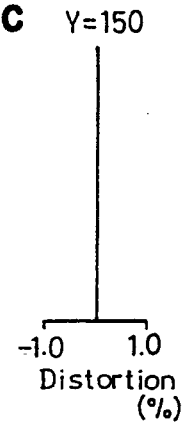
—— S
--- T
−1.0  1.0
Distortion
(%)
FIG. 15D  F_NO/9
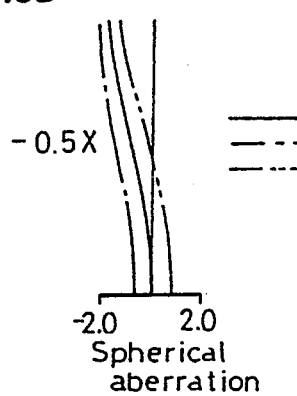
−0.5 X
−2.0  2.0
Spherical
aberration
—— d
—·— F
—··— C
FIG. 15E  Y=75
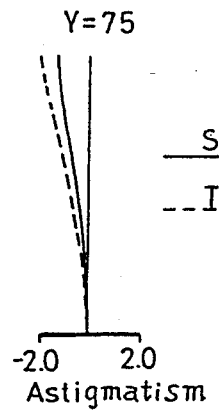
−2.0  2.0
Astigmatism
FIG. 15F  Y=75
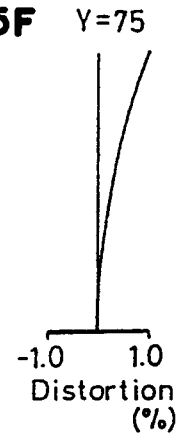
—— S
--- T
−1.0  1.0
Distortion
(%)
FIG. 15G  F_NO/9
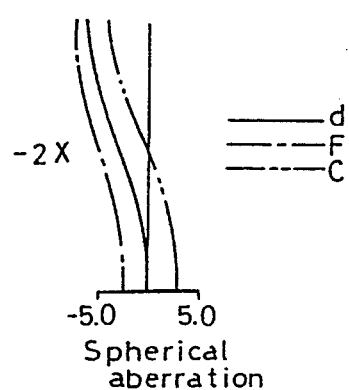
−2 X
−5.0  5.0
Spherical
aberration
—— d
—·— F
—··— C
FIG. 15H  Y=150
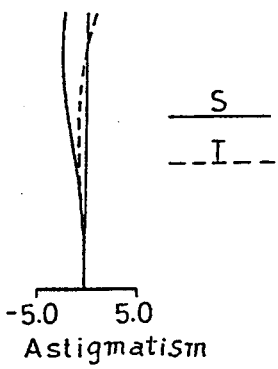
−5.0  5.0
Astigmatism
FIG. 15I  Y=150
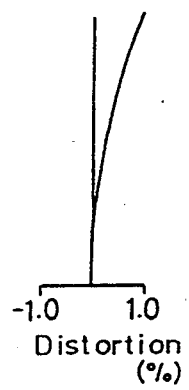
—— S
--- T
−1.0  1.0
Distortion
(%)

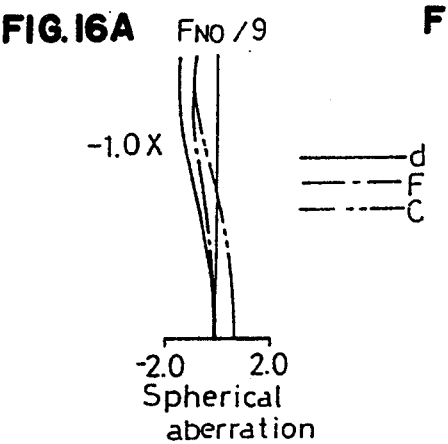
FIG. 16A  F_NO /9
FIG. 16B  Y=150
FIG. 16C  Y=150
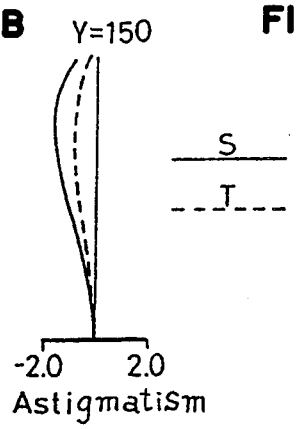
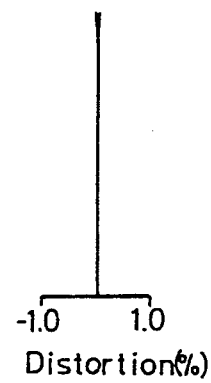
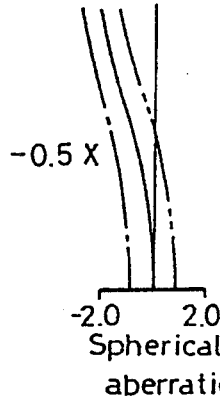
FIG. 16D  F_NO /9
FIG. 16E  Y=75
FIG. 16F  Y=75
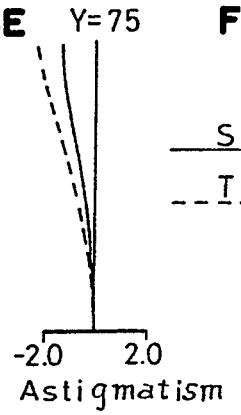
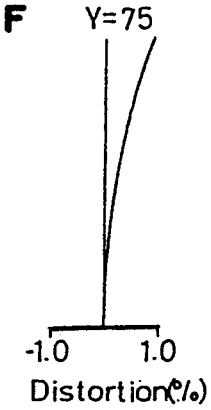
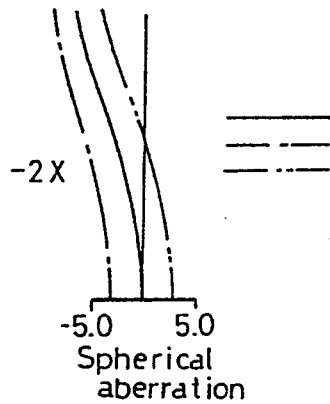
FIG. 16G  F_NO /9
FIG. 16H  Y=150
FIG. 16I  Y=150
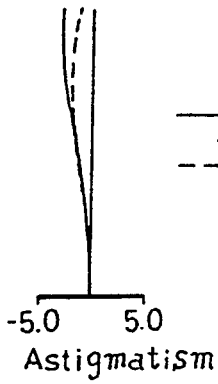
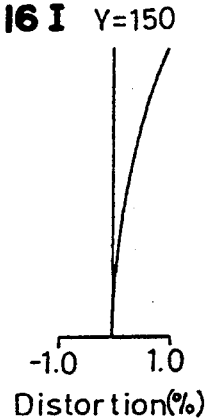

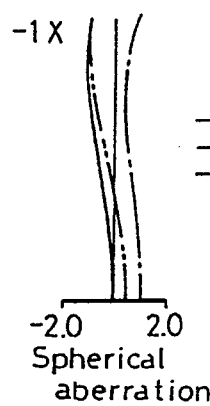
FIG. 17A  F$_{NO}$/9
−1X
−2.0  2.0
Spherical aberration
d
F
C
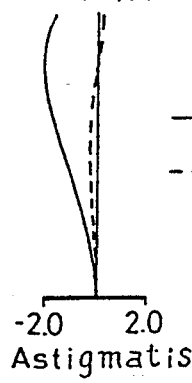
FIG. 17B  Y=150
−2.0  2.0
Astigmatism
S
T
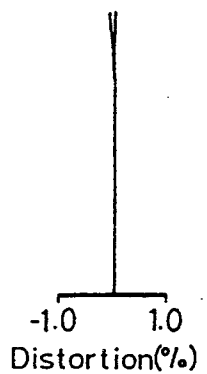
FIG. 17C  Y=150
−1.0  1.0
Distortion(%)
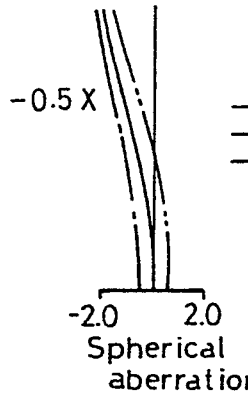
FIG. 17D  F$_{NO}$/9
−0.5X
−2.0  2.0
Spherical aberration
d
F
C
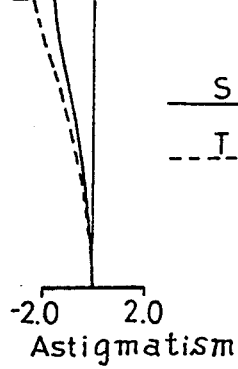
FIG. 17E  Y=75
−2.0  2.0
Astigmatism
S
T
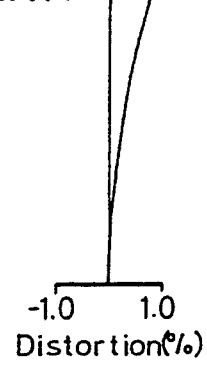
FIG. 17F  Y=75
−1.0  1.0
Distortion(%)
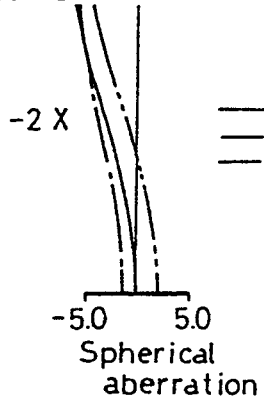
FIG. 17G  F$_{NO}$/9
−2X
−5.0  5.0
Spherical aberration
d
F
C
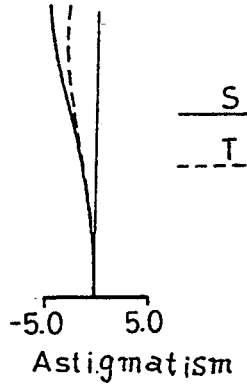
FIG. 17H  Y=150
−5.0  5.0
Astigmatism
S
T
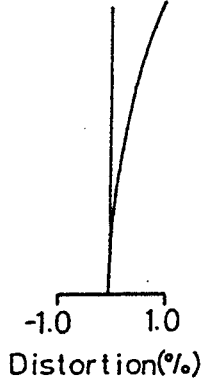
FIG. 17I  Y=150
−1.0  1.0
Distortion(%)

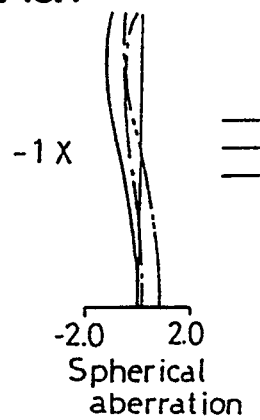
FIG. 18A F_NO/9
−1 X
−2.0  2.0
Spherical aberration
d
F
C
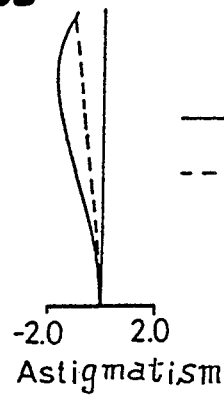
FIG. 18B Y=150
−2.0  2.0
Astigmatism
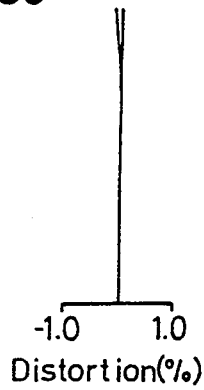
FIG. 18C Y=150
S
T
−1.0  1.0
Distortion(%)
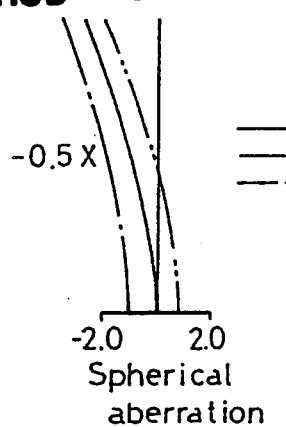
FIG. 18D F_NO/9
−0.5 X
−2.0  2.0
Spherical aberration
d
F
C
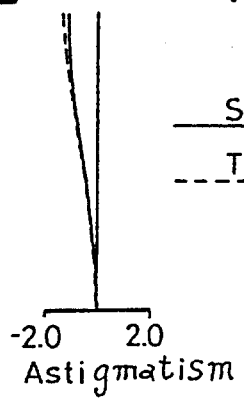
FIG. 18E Y=75
−2.0  2.0
Astigmatism
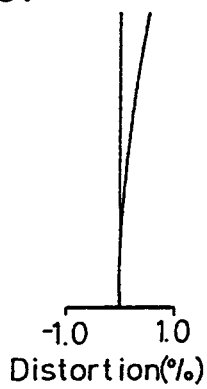
FIG. 18F Y=75
S
T
−1.0  1.0
Distortion(%)
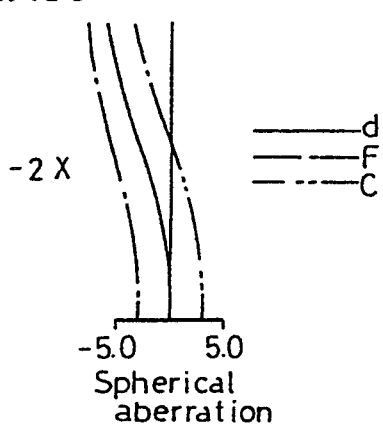
FIG. 18G F_NO/9
−2 X
−5.0  5.0
Spherical aberration
d
F
C
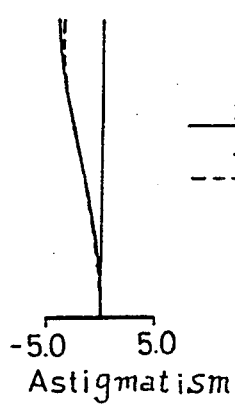
FIG. 18H Y=150
−5.0  5.0
Astigmatism
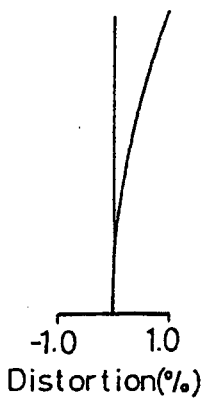
FIG. 18I Y=150
S
T
−1.0  1.0
Distortion(%)

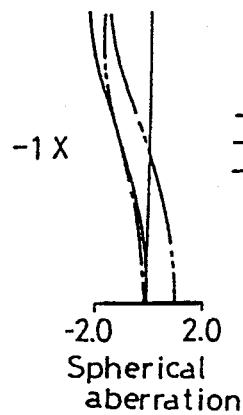
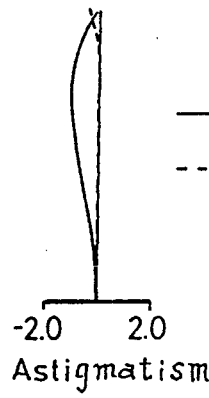
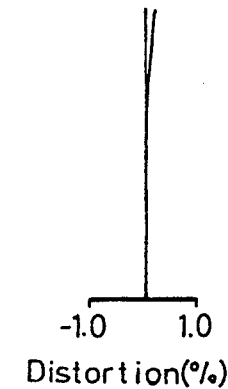
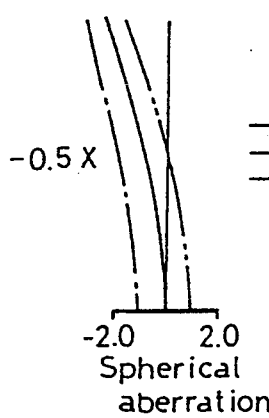
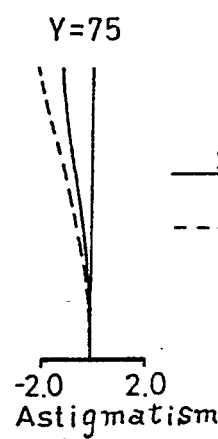
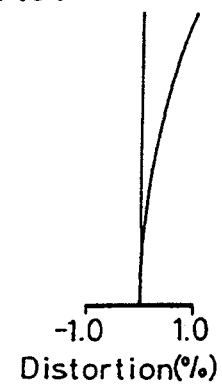
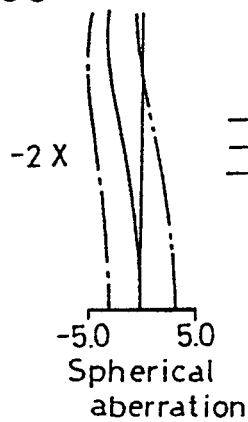
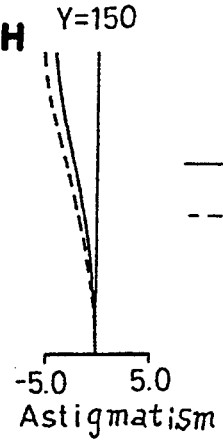
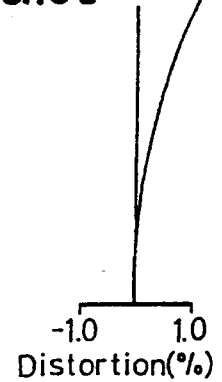

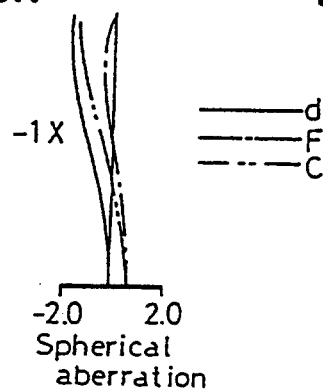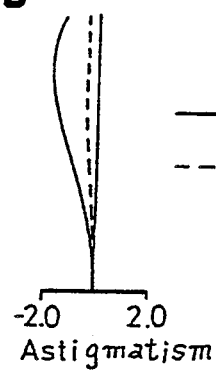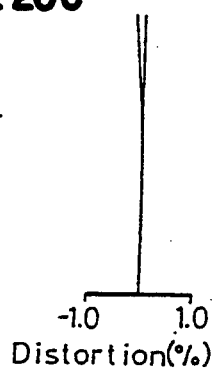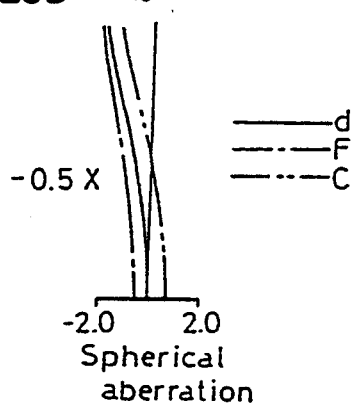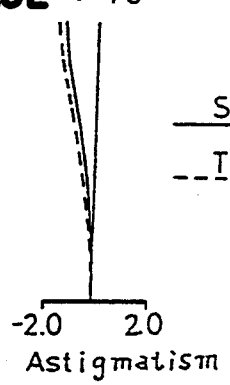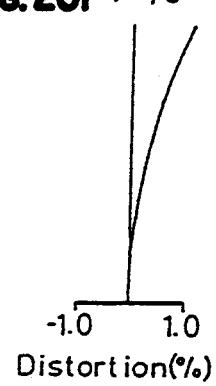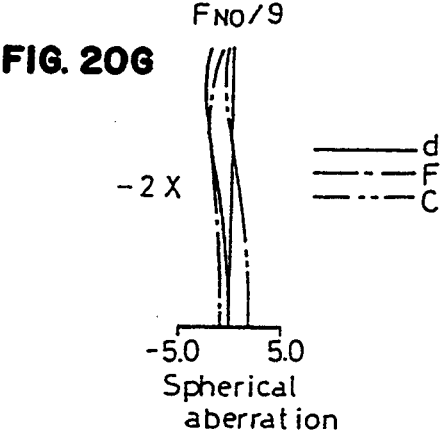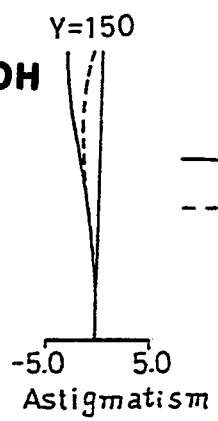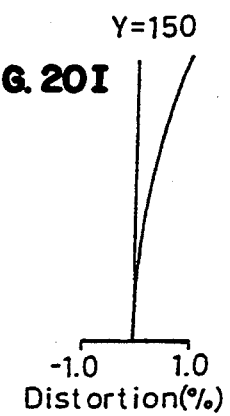

ZOOM LENS SYSTEM FOR USE IN A COPYING APPARATUS

BACKGROUND OF THE INVENTION

1. Field of the Invention

The present invention relates to a zoom lens system, and more specifically, to a zoom lens system, for use in a copying apparatus, where zooming is performed while a conjugate distance is kept constant.

2. Description of the Prior Art

In most of the copying apparatuses having a zooming function, zooming is still performed by a conjugate distance zooming method where a mirror is moved. However, if a zooming method is employed where a conjugate distance is kept constant by using a zoom lens system, continuous zooming can be performed only by moving the zoom lens system. As a result, the size of the copying apparatus can be reduced. For this reason, such zoom lens systems have been proposed to be incorporated into a copying apparatus recently.

For example, Japanese Laid-open Patent Application No. H1-123210 discloses a conjugate distance variable zoom lens system for use in a copying apparatus. The zoom lens system has five or eight lens elements with an f-number of 6.7 or 4, half view angles $\omega$ of 20.8° to 16.1° or 15.0° to 12.5° and magnifications of 0.5× to 2.0× or 0.64× to 1.54×. The zoom lens system is a three-unit lens system of a negative, positive, negative configuration, and zooming is performed by asymmetrically moving the first lens unit of a negative power and the third lens unit of a negative power. Although it is mentioned in the specification of this prior art that it offers no problem if there is a slight asymmetry in radius of curvature and axial thicknesses of the lens elements, the zoom lens system is, basically, symmetrical with respect to an aperture stop or a central lens element at a magnification of −1×. As advantages thereof the following are described. That is, aberrations can excellently be corrected in wide zoom ranges of −0.5× to −2.0× and 0.64× to 1.54×. Moreover, at a magnification larger than unity, a large distance can be secured between the lens system and an object surface, and at a magnification smaller than unity, a large distance can be secured between the lens system and an image surface.

U.S. Pat. No. 4,832,465 also discloses a conjugate distance variable zoom lens system for use in a copying apparatus. The zoom lens system has four and five lens elements grouped into two lens units with an f-number of 6.7, angles of view $2\omega$ of 42° to 36° and magnifications of 1.42× to 0.64×. Zooming is performed by moving the entire lens system while varying the distance between the first lens unit of a positive power and the second lens unit of a negative power.

Among presently-known zoom lens systems for use in a copying apparatus, the ones which have the fewest number of lens elements are four-element lens systems. In such zoom lens systems, excellent aberration correction is achieved in various types in a zoom range of approximately −0.7× to 1.4×; however, when the magnification is outside the zoom range, the movement amount of the lens and variation in aberration are remarkably large. For this reason, it is impossible to put the zoom lens systems to practical use.

SUMMARY OF THE INVENTION

An object of the present invention is to provide a zoom lens system for use in a copying apparatus being of low cost and where aberrations can excellently be corrected in a wide zoom range of 0.5× to 2.0× and a smaller movement amount of the lens is required for zooming.

To achieve the above-mentioned object, a zoom lens system of the present invention is provided with from the object side: a first lens unit of a negative power including a first lens element of a negative power strongly concave to the object side; a second lens unit of a positive power including a second lens element which is a positive meniscus lens element convex to the object side, a third lens element which is a bi-concave lens element whose object side surface has a larger radius of curvature and a fourth lens element which is a bi-convex lens element, said second lens unit being overall positive and a distance between the second and third lens elements slightly varying; and a third lens unit of a negative power including a fifth lens element which is a negative meniscus lens element concave to the image side, wherein the following conditions are fulfilled:

$$0.4 < \frac{F2}{F} < 0.6$$

$$0.95 < \frac{F1}{F3} < 1.35$$

where F represents a focal length of the entire lens system at a magnification of −1×, F1 represents a focal length of the first lens unit at a magnification of −1×, F2 represents a focal length of the second lens unit at a magnification of −1× and F3 represents a focal length of the third lens unit at a magnification of −1×, and wherein zooming is performed while a conjugate distance is kept constant by: varying a distance between the first and second lens units and a distance between the second and third lens units so that the following conditions are fulfilled:

$$\Delta d2 < d8 \text{ when } |\beta| > 1$$

$$\Delta d2 > \Delta d8 \text{ when } |\beta| < 1$$

where $\Delta d2$ represents a variation amount of the distance between the first and second lens units during zooming, $\Delta d8$ represents a variation amount of the distance between the second and third lens units during zooming and $\beta$ represents a magnification; varying, at least either at a magnification larger than unity or at a magnification smaller than unity, a distance between the second and third lens elements of the second lens unit so that the following conditions are fulfilled:

$$d4 < d4' \text{ when } |\beta| > 1$$

$$d4 > d4' \text{ when } |\beta| < 1$$

where d4 represents the distance between the second and third lens elements at unity magnification and d4' represents the distance between the second and third lens elements at a magnification other than unity; and moving the entire lens system along the optical axis.

BRIEF DESCRIPTION OF THE DRAWINGS

This and other objects and features of this invention will become clear from the following description, taken in conjunction with the preferred embodiments with reference to the accompanied drawings in which:

FIGS. 11A, 11B, 11C, 11D, 11E, 11F, 11G, 11H and 11I are graphic representations of spherical aberration, astigmatism and distortion of the first embodiment of FIG. 1 at magnifications of $-1\times$, $-0.5\times$ and $-2\times$, respectively;

FIGS. 12A, 12B, 12C, 12D, 12E, 12F, 12G, 12H and 12I are graphic representations of spherical aberration, astigmatism and distortion of the second embodiment of FIG. 2 at magnifications of $-1\times$, $-0.5\times$ and $-2\times$, respectively;

FIGS. 13A, 13B, 13C, 13D, 13E, 13F, 13G, 13H and 13I are graphic representations of spherical aberration, astigmatism and distortion of the third embodiment of FIG. 3 at magnifications of $-1\times$, $0.5\times$ and $-2\times$, respectively;

FIGS. 14A, 14B, 14C, 14D, 14E, 14F, 14G, 14H and 14I are graphic representations of spherical aberration, astigmatism and distortion of the fourth embodiment of FIG. 4 at magnifications of $-1\times$, $-0.5\times$ and $-2\times$, respectively;

FIGS. 15A, 15B, 15C, 15D, 15E, 15F, 15G, 15H and 15I are graphic representations of spherical aberration, astigmatism and distortion of the fifth embodiment of FIG. 5 at magnifications of $-1\times 0.5\times$ and $-2\times$, respectively;

FIGS. 16A, 16B, 16C, 16D, 16E, 16F 16G, 16H and 16I are graphic representations of spherical aberration, astigmatism and distortion of the sixth embodiment of FIG. 6 at magnifications of $-1\times$, $-0.5\times$ and $-2\times$, respectively;

FIGS. 17A, 17B, 17C, 17D, 17E, 17F, 17G, 17H and 17I are graphic representations of spherical aberration, astigmatism and distortion of the seventh embodiment of FIG. 7 at magnifications of $-1\times$, $-0.5\times$ and $-2\times$, respectively;

FIGS. 18A, 18B, 18C, 18D, 18E, 18F, 18G, 18H, and 18I are graphic representations of spherical aberration, astigmatism and distortion of the eighth embodiment of FIG. 8 at magnifications of $-1\times$, $-0.5\times$ and $-2\times$, respectively;

FIGS. 19A, 19B, 19C, 19D, 19E, 19F, 19G, 19H and 19I are graphic representations of spherical aberration, astigmatism and distortion of the ninth embodiment of FIG. 9 at magnifications of $-1\times$, $-0.5\times$ and $-2x$, respectively;

FIGS. 20A, 20B, 20C, 20D, 20E, 20F, 20G, 20H and 20I are graphic representations of spherical aberration, astigmatism and distortion of the tenth embodiment of FIG. 10 at magnifications of $-1\times$, $-0.5\times$ and $-2\times$, respectively;

DESCRIPTION OF THE PREFERRED EMBODIMENTS

Figure 1:
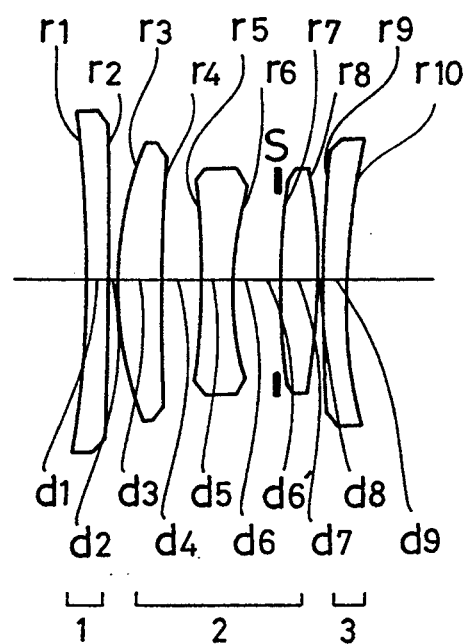
FIG. 1 is a cross-sectional view showing a lens arrangement of a first embodiment of the present invention.
Figure 2:
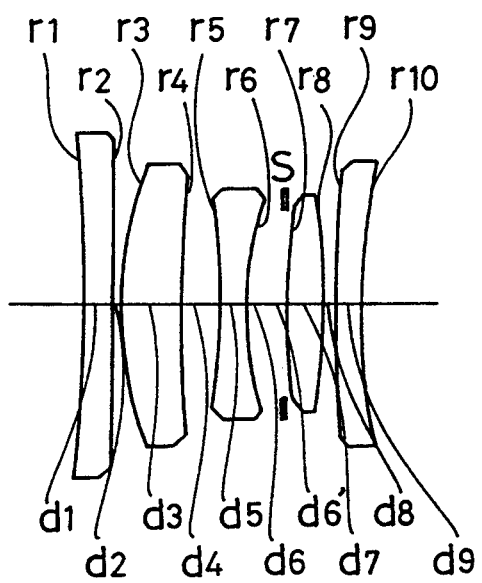
FIG. 2 is a cross-sectional view showing a lens arrangement of a second embodiment of the present invention.
Figure 3:
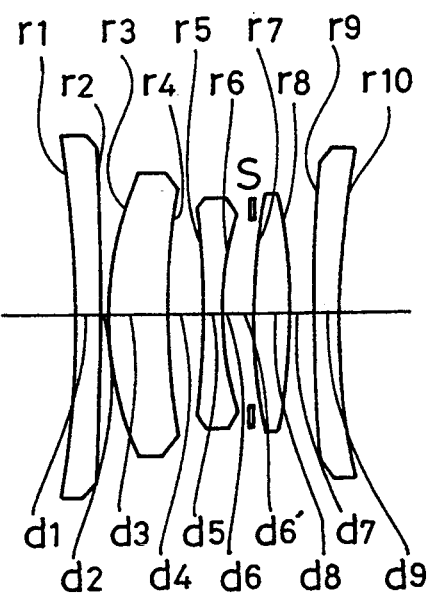
FIG. 3 is a cross-sectional view showing a lens arrangement of a third embodiment of the present invention.
Figure 4:
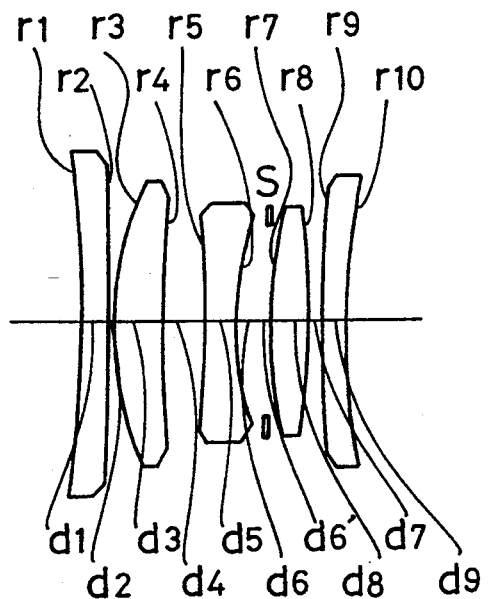
FIG. 4 is a cross-sectional view showing a lens arrangement of a fourth embodiment of the present invention.
Figure 5:
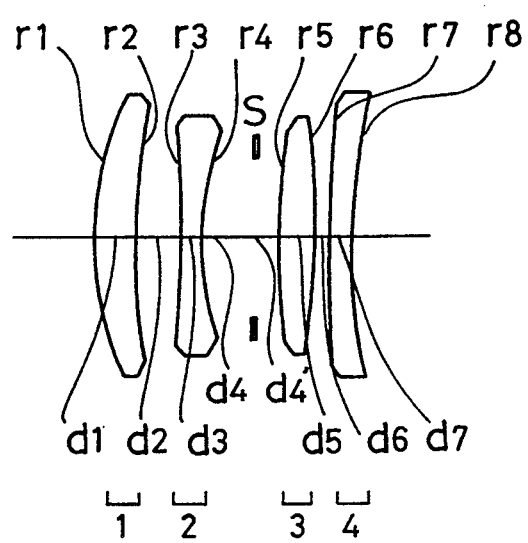
FIG. 5 is a cross-sectional view showing a lens arrangement of a fifth embodiment of the present invention.
Figure 6:
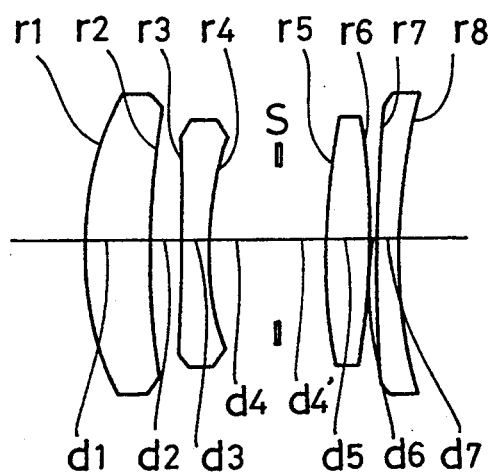
FIG. 6 is a cross-sectional view showing a lens arrangement of a sixth embodiment of the present invention.
Figure 7:
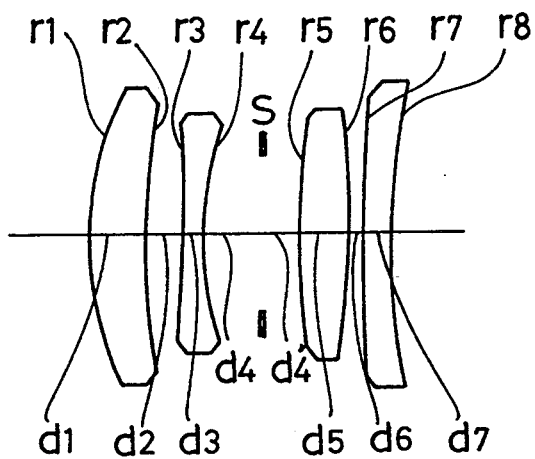
FIG. 7 is a cross-sectional view showing a lens arrangement of a seventh embodiment of the present invention.
Figure 8:
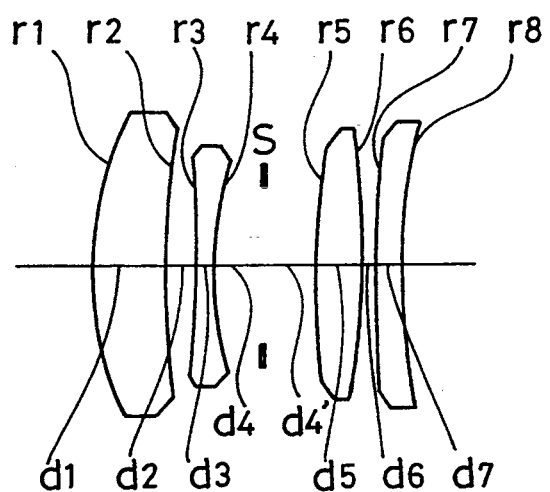
FIG. 8 is a cross-sectional view showing a lens arrangement of an eighth embodiment of the present invention.

Embodiments of the present invention will hereinafter be described with reference to the drawings.

FIGS. 1 to 4 are cross-sectional views showing lens arrangements of first to fourth embodiments, respectively. The first to fourth embodiments comprise from the object side: a first lens unit of a negative power including a first lens element of a negative power strongly concave to the object side; a second lens unit of a positive power including a second lens element which is a positive meniscus lens element convex to the object side, a third lens element which is a bi-concave lens element whose object side surface has a larger radius of curvature and a fourth lens element which is a bi-convex lens element, said second lens unit being overall positive and a distance d4 between the second and third lens elements slightly varying; and a third lens unit of a negative power including a fifth lens element which is a negative meniscus lens element concave to the image side.

These embodiments fulfill the following conditions (1) and (2):

$$0.4 < \frac{F2}{F} < 0.6 \quad (1)$$

$$0.95 < \frac{F1}{F3} < 1.35 \quad (2)$$

where F represents a focal length of the entire lens system at a magnification $\beta$ of $-1\times$, F1 represents a focal length of the first lens unit 1 at a magnification $\beta$ of $-1\times$, F2 represents a focal length of the second lens unit 2 at a magnification $\beta$ of $-1\times$ and F3 represents a focal length of the third lens unit 3 at a magnification $\beta$ of $-1\times$. Moreover, a distance d2 between the first and second lens Units and a distance d8 between the second and third lens units vary during zooming so that the following conditions (3) are fulfilled:

$$\Delta d2 < \Delta d8 \text{ when } |\beta| > 1 \atop \Delta d2 > \Delta d8 \text{ when } |\beta| < 1 \rbrace \quad (3)$$

where $\Delta d2$ represents a variation amount of the distance d2 during zooming and $\Delta d8$ represents a variation amount of the distance d8 during zooming. Further, a distance d4 between the second and third lens elements of the second lens unit 2 fulfills the following condition either at a magnification larger than unity or at a magnification smaller than unity:

$$d4 < d4' \text{ when } |\beta| > 1 \atop d4 > d4' \text{ when } |\beta| < 1 \rbrace \quad (4)$$

where d4 represents a distance between the second and third lens elements at unity magnification and d4' represents a distance between the second and third lens elements at a magnification other than unity.

The condition (1) determines the power arrangement of the second lens unit 2. When the upper limit is exceeded, the power of the second lens unit 2 decreases. Although this is advantageous in aberration correction, it is required to decrease the powers of the first and third lens units 1 and 3 in order to reduce the size of the lens system at unity magnification, so that the movement amount during zooming is large. As a result, it is impossible to reduce the size of the entire lens system including the size at a magnification other than unity. When the lower limit is exceeded, conversely, the powers of the first and third lens units 1 and 3 increase. In this case, although the size can be reduced since the movement amount during zooming is small, the power of the second lens unit 2 which is used for aberration correction increases. As a result, it is extremely difficult to correct aberrations at unity magnification and at a magnification other than unity.

The condition (2) determines the power distribution of the first and third lens units 1 and 3. It also determines the degree of asymmetry. When the upper or lower limit is exceeded, the power at the front portion of the lens system and the power at the rear portion of the lens system are too different at a magnification close to unity, so that asymmetric aberration such as off-axial coma is generated so largely that it is difficult to correct it.

Figure 21:
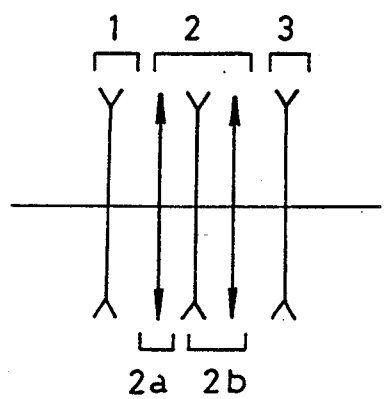
FIG. 21 shows a lens arrangement for explaining a zooming condition of the first to fourth embodiments of the present invention.
Figure 22:
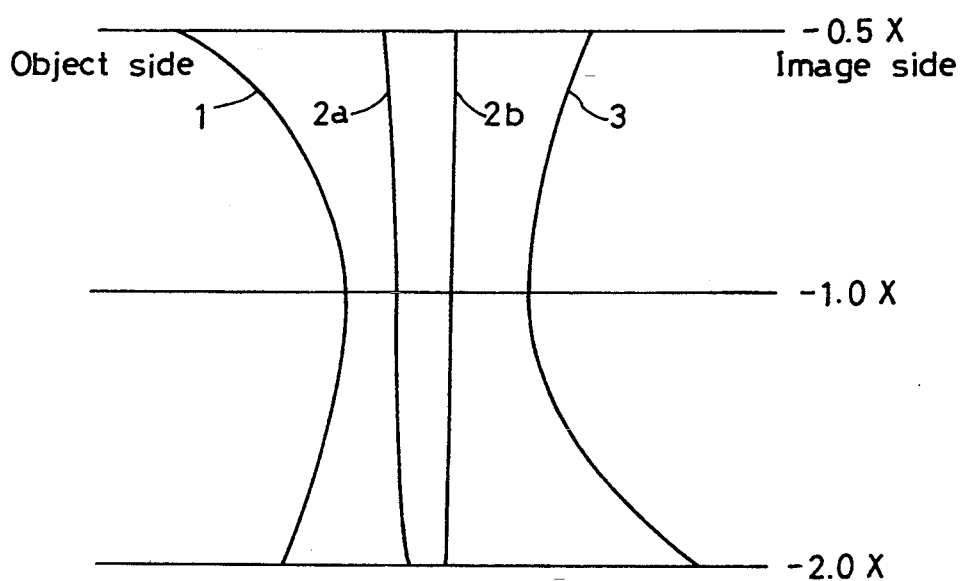
FIG. 22 shows a movement condition of each lens unit of the first to fourth embodiments of the present invention during zooming.

As shown in the schematic view of FIG. 21 and the curved line view of FIG. 22 showing a movement of each lens unit during zooming, the first and third lens units 1 and 3 serve as zooming units in the zooming range from $-0.5\times$ to $-2.0\times$. Zooming to a magnification larger than unity is performed by moving the third lens unit 3 by a larger amount than the first lens unit 1. Zooming to a magnification smaller than unity is performed by moving the first lens unit 1 by a larger amount than the third lens unit 3. By these movement manners, the distance between the object surface and the object-end lens surface in the zoom range of $-1.0\times$ to $-2.0\times$ is larger than that in the zoom range of $-1.0\times$ to $-0.5\times$, while the distance between the image-end lens surface and the image surface in the zoom range of $-1.0\times$ to $-0.5\times$ is larger than that in the zoom range of 1.0× to 2.0×. With this arrangement, it is possible to reduce the lens movement range required for zooming to be smaller than those of symmetric zoom lens systems and symmetrically moving zoom lens systems. Thus, the size of the zoom lens system including the size of associated apparatuses can be reduced. The condition (3) determines the above movement amounts.

The condition (4) is for correcting aberrations (chiefly meridional astigmatism and distortion, and lateral chromatic aberration) generated due to the asymmetric movement of the first and third lens units 1 and 3 by slightly varying the distance d4 between a front unit 2a including the second lens element and a rear unit 2b including the third and fourth lens elements of the second lens unit 2. This correction enables reduction in movement range of the entire lens system in a wide zoom range of $-0.5\times$ to $-2.0\times$.

Specifically, the condition (4) is for correcting, at a magnification larger than unity, meridional astigmatism inclining toward the plus side so as to incline toward the minus side while at the same time correcting distortion and lateral chromatic aberration so as to decrease by decreasing the distance d4 between the front and rear units 2a and 2b of the second lens unit 2, and for correcting, at a magnification smaller than unity, meridional astigmatism inclining too much toward the minus side so as to approach the plus side while at the same time correcting distortion and lateral chromatic aberration so as to decrease.

These embodiments are smaller in movement range by 15% of the focal length than symmetrically moving zoom lens systems of the same type having the same specification. Moreover, since the second lens unit 2 is of asymmetric arrangement, aberration correction at a magnification other than unity, not to mention aberration correction at unity magnification, is excellently made.

Moreover, the first to fourth embodiments fulfill the following conditions (5) to (9):

$$0.2 < \frac{r1}{F1} < 0.6 \quad (5)$$

$$0.2 < \left| \frac{r10}{F3} \right| < 0.4 \quad (6)$$

$$\nu1, \nu2 > 50 \quad (7)$$

$$0.7 < \frac{f2}{F2} < 1.0 \quad (8)$$

$$0.03 < \frac{f3 + f4}{F2} < 0.13 \quad (9)$$

where ri represents a radius of curvature of an ith surface, fi represents a focal length of an ith lens element, $\nu$i represents an Abbe number of an ith lens element and Fi represents a focal length of an ith lens unit.

The conditions (5) and (6) define the configuration of the first lens element of the first lens unit 1 and the configuration of the fifth lens element of the third lens unit 3, respectively. They also determine the power of the object-side-end concave surface and the power of the image-side-end concave surface. These conditions are directed chiefly to aberration correction with respect to off-axial rays. By fulfilling the conditions (5) and (6), aberration is held in an excellently corrected condition both at unity magnification and at a magnification other than unity. When the upper limits are exceeded, negative field curvature is generated at a magnification larger than unity and positive field curvature is generated at a magnification smaller than unity, so that the effect of the distance d4 on aberration correction cannot be obtained. When the lower limits are exceeded, chromatic aberration increases so much at a magnification other than unity that it is difficult to correct it.

The condition (7) is for reducing variation in chromatic aberration. When this condition is not fulfilled, chromatic aberration is unduly large at a magnification other than unity, so that it is extremely difficult to correct it.

The conditions (8) and (9) determine the power distribution of the second lens unit 2. When the upper limit of the condition (8) is exceeded, spherical aberration is overcorrected, so that astigmatism also increases. When the lower limit is exceeded, aspherical aberration is undercorrected, so that coma flare is also generated.

The condition (9) determines the power distributions of the third and fourth lens elements. When the upper limit is exceeded, spherical aberration is overcorrected. When the lower limit is exceeded, field curvature increases.

FIGS. 5 to 8 are cross-sectional views showing lens arrangements of fifth to eighth embodiments of the present invention. The fifth to eighth embodiments comprise from the object side a first lens unit 1 including a first lens element 1 which is a positive meniscus lens element convex to the object side, a second lens unit 2 including a second lens element 2 which is a bi-concave lens element whose object side surface has a larger radius of curvature, an aperture stop S, a third lens unit 3 including a third lens element 3 which is a bi-convex lens element and a fourth lens unit 4 including a fourth lens element 4 which is a negative meniscus lens element concave to the image side.

Figure 23:
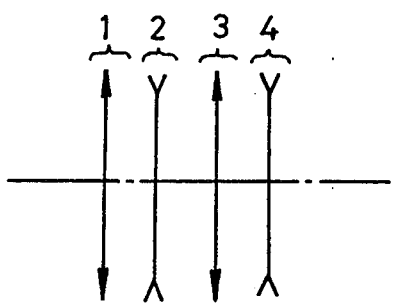
FIG. 23 shows a lens arrangement for explaining a zooming condition of the fifth to eighth embodiments of the present invention.
Figure 24:
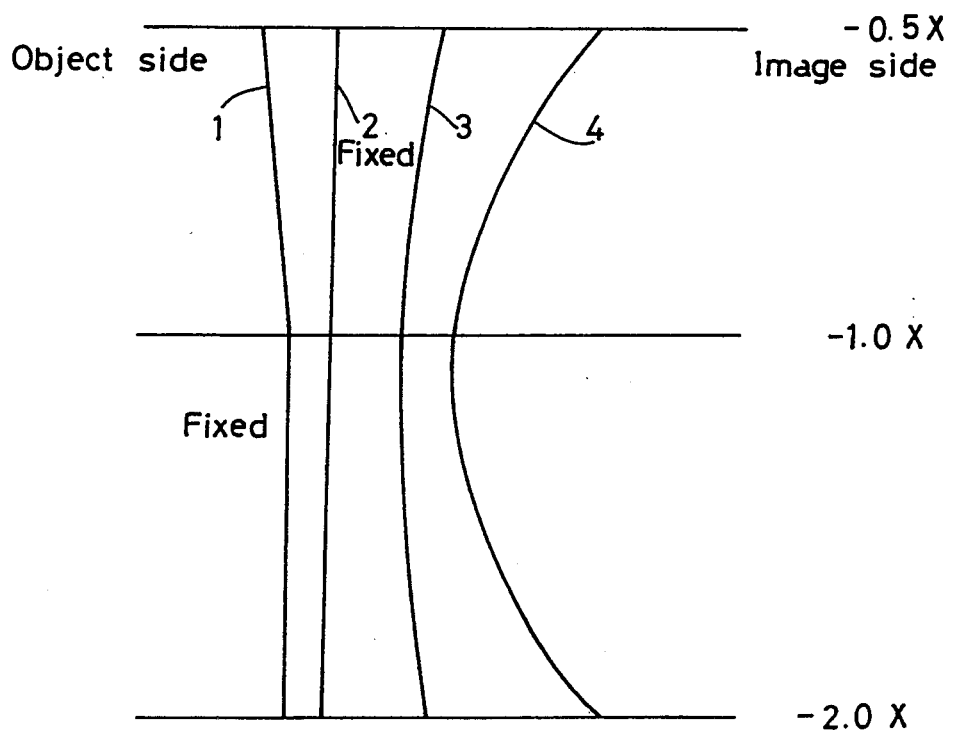
FIG. 24 shows a movement condition of each lens unit of the fifth to eighth embodiments of the present invention during zooming.

As shown in the schematic view of FIG. 23 and the curved line view of FIG. 24 showing a movement of each lens unit during zooming, during zooming from $-0.5\times$ to $-2.0\times$, at magnifications from $-0.5\times$ to $-1.0\times$, the second lens element 2 is fixed and zooming is performed by moving the first, third and fourth lens elements 1, 3 and 4 in a manner such that each of the distances between the lens elements is decreased, while at magnifications from $-1.0\times$ to $-2.0\times$, the first lens element 1 is fixed and zooming is performed by moving the second, third and fourth lens elements 2, 3 and 4 in a manner such that the distance between the first and second lens element 1 and 2 is kept intact and that the distances between the second and third lens elements 2 and 3 and between the third and fourth lens elements 3 and 4 are increased, and by moving the entire lens system along the optical axis.

Further, the following condition (10) is fulfilled:

$$\Delta d2 < \Delta d4 < \Delta d6 \qquad (10)$$

where $\Delta d2$ represents a variation amount of a distance d2 between the first and second lens elements 1 and 2 during zooming from the distance d2 obtained at unity magnification, $\Delta d4$ represents a variation amount of a distance d4 between the second and third lens elements 2 and 3 during zooming from the distance d4 obtained at unity magnification, and $\Delta d6$ represents a variation amount of a distance d6 between the third and fourth lens elements 3 and 4 during zooming from the distance d6 obtained at unity magnification.

The condition (10) defines the distances between the lens elements. In the fifth to eighth embodiments, when the magnification is smaller than unity, by combining the distance d2 between the first and second lens elements 1 and 2 with the distance d4 between the second and third lens elements 2 and 3, meridional astigmatism inclining toward the minus side is corrected so as to approach the plus side. Moreover, the distance d4 between the second and third lens elements 2 and 3 serves to correct meridional astigmatism while correcting lateral chromatic aberration when the magnification is larger than unity. Specifically, the distance d4 serves to correct meridional astigmatism inclining toward the plus side so as to incline toward the minus side. Then, by combining the distance d2 between the first and second lens elements 1 and 2 with the distance d4 when the magnification is smaller than unity, lateral chromatic aberration is corrected. Further, the first to third lens elements 1 to 3 are positive as a whole and the fourth lens element 4 is negative, and zooming is performed by varying the focal length by varying the distance d6 between the third and fourth lens elements 3 and 4.

That is, by varying the distances in accordance with the condition (10), the aforementioned aberration corrections are excellently achieved in a wide zoom range.

The fifth to eighth embodiments also fulfill the following conditions (11) to (13):

$$0.45 < \frac{f123}{f} < 0.65 \qquad (11)$$

$$0.8 < \left|\frac{f4}{f}\right| < 1.4 \qquad (12)$$

$$\nu 4 > 50 \qquad (13)$$

where f123 represents a composite focal length of the first, second and third lens elements 1, 2 and 3 at unity magnification, f represents a focal length of the entire lens system at unity magnification, f4 represents a focal length of the fourth lens element at unity magnification and $\nu 4$ represents an Abbe number of the fourth lens element 4.

The condition (11) defines the power arrangement of the lens system. When the lower limit is exceeded, the powers of the first to third lens elements 1 to 3 which serve as aberration correcting units are unduly large, so that aberration correction is difficult at unity magnification and at a magnification other than unity. When the upper limit is exceeded, although this state is advantageous in aberration correction, the variation amount $\Delta d6$ is unduly large during zooming, so that the size of the lens system increases, which is incompatible with the object of the present invention, i.e. the reduction of size.

The condition (12) defines the power of the fourth lens element 4 which serves as a zooming unit. It is a condition for realizing a wide zoom range of $-0.5\times$ to $-2.0\times$ in the lens system where aberration correction has been made under the condition (11). When the lower limit is exceeded, the power of the fourth lens element 4 is unduly large, so that variation in aberration is too large to correct at a magnification other than unity. When the upper limit is exceeded, the variation amount $\Delta d6$ is unduly large, so that the size of the lens system increases. Further, this state is disadvantageous, although less disadvantageous than the case where the lower limit is exceeded, in aberration correction at a magnification where the upper or lower limit of a condition $0.7 < |\beta| < 1.6$ is exceeded.

The condition (13) defines an Abbe number of the fourth lens element 4. It is for correcting chromatic aberration. When the limit is exceeded, variation in chromatic aberration is unduly large, particularly, at a magnification where the upper or lower limit of the condition $0.7 < |\beta| < 1.6$ is exceeded, so that it is impossible to correct it.

Figure 9:
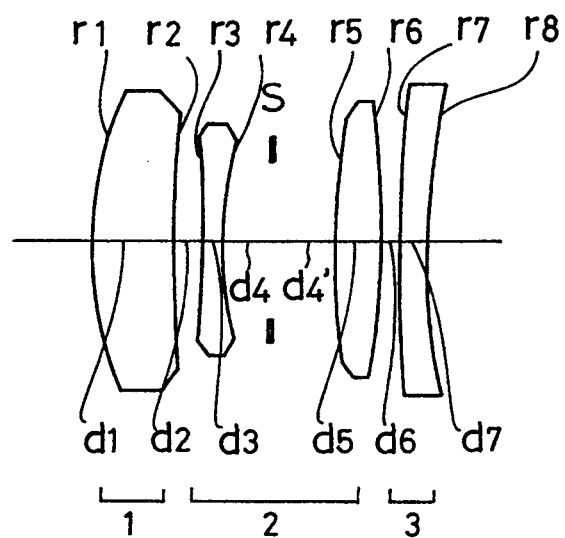
FIG. 9 is a cross-sectional view showing a lens arrangement of a ninth embodiment of the present invention.
Figure 10:
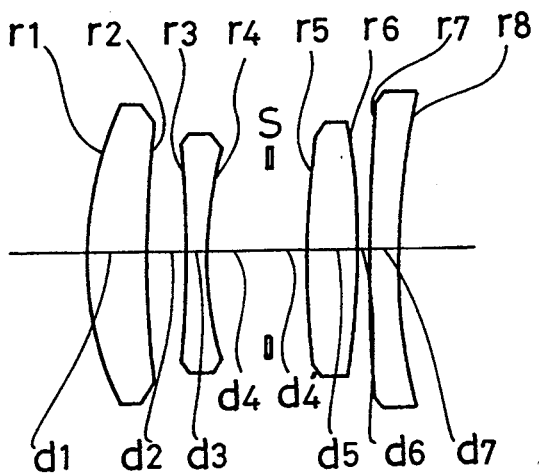
FIG. 10 is a cross-sectional view showing a lens arrangement of a tenth embodiment of the present invention.

FIGS. 9 and 10 are cross-sectional views showing lens arrangements of ninth and tenth embodiments. The ninth and tenth embodiments comprise from the object side a first lens element which is a positive meniscus lens element convex to the object side, a second lens element which is a bi-concave lens element whose object side surface has a larger radius of curvature, an aperture stop S, a third lens element which is a bi-convex lens element and a fourth lens element which is a negative meniscus lens element concave to the image side.

Figure 25:
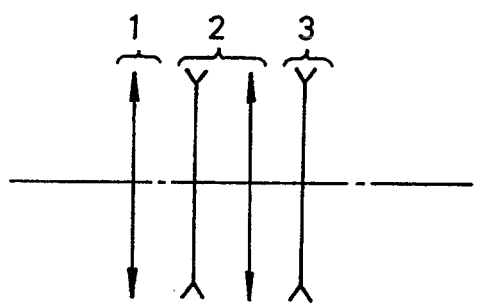
FIG. 25 shows a lens arrangement for explaining a zooming condition of the ninth and tenth embodiments of the present invention.
Figure 26:
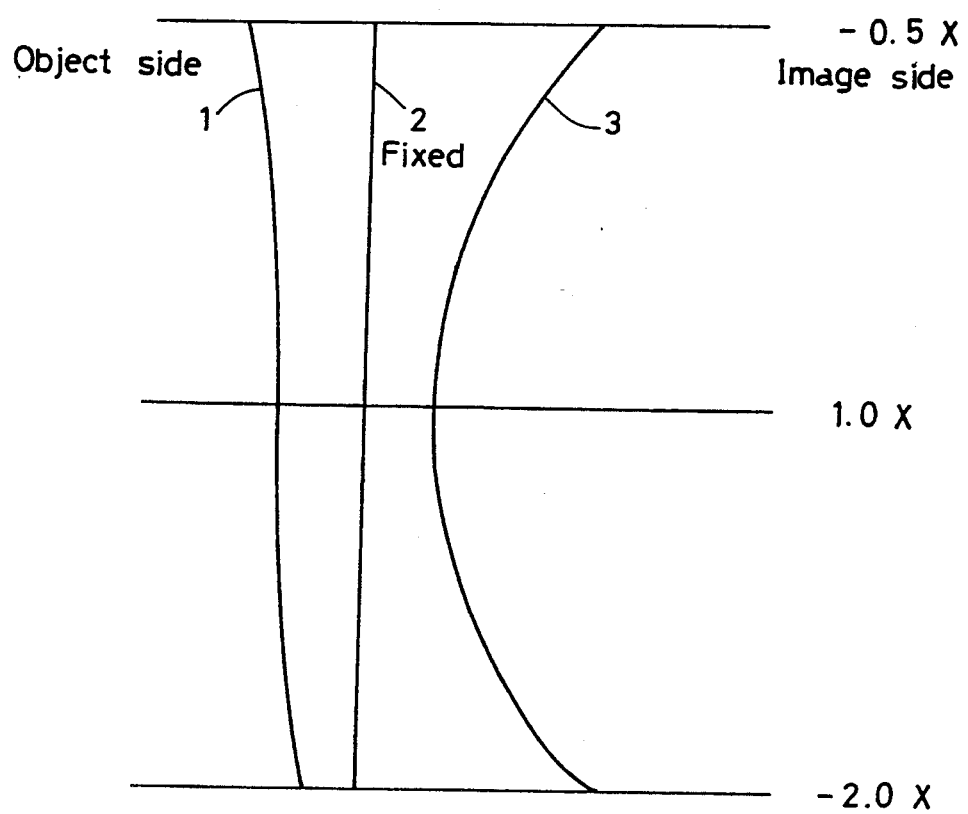
FIG. 26 shows a movement condition of each lens unit of the ninth and tenth embodiments of the present invention during zooming.

As shown in the schematic view of FIG. 25 and the curved line view of FIG. 26 showing a movement of each lens unit during zooming, the second lens unit 2 is fixed during zooming from $-0.5\times$ to $-2.0\times$, and zooming to a magnification smaller than unity i.e. from $-0.5\times$ to $-2.0\times$ is performed by decreasing the distances between the first and second lens units 1 and 2 and between the second and third lens units 2 and 3. Zooming to a magnification larger than unity i.e. from $-1.0\times$ to $-2.0\times$ is performed by moving the first lens unit 1 so that the distance between the first and second lens units 1 and 2 decreases, moving the third lens unit 3 so that the distance between the second and third lens units 2 and 3 decreases and moving the entire lens system along the optical axis.

Moreover, the following conditions (14) and (15) are fulfilled:

$$d2' < d2 \quad \text{when} \quad |\beta| > 1$$
$$d2' > d2 \quad \text{when} \quad |\beta| < 1 \quad (14)$$

$$|\Delta d2| < \Delta d6 \quad (15)$$

where d2 represents a distance between the first and second lens units 1 and 2 at unity magnification, d2' represents a distance between the second and third lens units 2 and 3 at a magnification other than unity, Δd2 represents a variation amount of the distance d2 during zooming and Δd6 represents a variation amount of a distance d6 between the second and third lens units 2 and 3 during zooming.

The present invention is directed to a zoom lens system for use in a copying apparatus which realizes a wide zoom range from $-0.5\times$ to $-2.0\times$ with fewer lens elements. The ninth and tenth embodiments have four lens elements grouped into three lens units. The details of variation in air spaces are shown in FIG. 26. The distance d2 between the first and second lens units 1 and 2 is varied in order to correct field curvature, to correct meridional astigmatism inclining toward the minus side so as to approach zero at a magnification smaller than unity and to correct meridional astigmatism inclining toward the plus side so as to incline toward the minus side at a magnification larger than unity. The first to third lens elements are positive as a whole and the third lens unit 3 is negative, and zooming is performed by varying the focal length by varying the distance d6 between the second and third lens units 2 and 3.

The condition (14) defines the distance d2 between the first and second lens units 1 and 2. The condition (15) defines the distance between the second and third lens units 2 and 3. This arrangement enables aberration correction in a wide zoom range from $-0.5\times$ to $-2.0\times$ with only four lens elements.

Similarly to the previously-described fifth to eighth embodiment, the ninth and tenth embodiments fulfill the previously-described conditions (11) to (13). The meanings of the conditions are the same in these embodiments as in the previously described fifth to eighth embodiments.

Tables 1, 3, 5, 7, 9, 11, 13, 15, 17 and 19 show data on the first to tenth embodiments. In each table, ri represents a radius of curvature of an ith lens surface from the object side, di represents an ith axial distance from the object side, Ni represents a refractive index to the d-line, of an ith lens element from the object side, and vi represents an Abbe number of an ith lens element from the object side. Tables 2, 4, 6, 8, 10, 12, 14, 16, 18 and 20 show values of axial distances which vary during zooming.

FIGS. 11A–I to 20A–I show graphic representations of spherical aberration, astigmatism and distortion of the first to tenth embodiments at magnifications of $-1\times$, $-0.50\times$ and $-2.00\times$, respectively.

Table 21 shows values for the conditions (1), (2) and (5) to (9) with respect to the first to fourth embodiments.

Table 22 shows values for the conditions (11) and (12) with respect to the fifth to eighth embodiments.

In the fifth to eighth embodiments, an aperture stop S is provided between the second and third lens elements 2 and 3. If the aperture stop S is moved so as to approach the third lens element 3 concomitantly with zooming, aberration correction will be more excellently made. This movement of the aperture stop S is effective, particularly, in correcting lateral aberration and coma flare at a magnification other than unity. Concomitantly therewith, correction of distortion and lateral chromatic aberration is excellently achieved. The fourth embodiment is an example of this case. In the fifth to seventh embodiments, while the aperture stop S is included by the second lens element 2, it is possible for the aperture stop S to be included by the third lens element 3 since the variation amount of the distance d4 between the second and third lens elements 2 and 3 is relatively small.

Table 23 shows values for the conditions (11) and (12) with respect to the ninth and tenth embodiments.

Obviously, many modifications and variations of the present invention are possible in light of the above teachings. It is therefore to be understood that within the scope of the appended claims, the invention may be practiced other than as specifically described.

TABLE 1

(1st Embodiment)
$F = 185.8$ to $210.0$, $\beta = -0.5$ to $-2.0$, f – number $= 8.0$

| | Radius of Curvature | | Axial Distance | Refractive Index | Abbe Number |
|---|---|---|---|---|---|
| 1 | r1 | −142.80 | | | |
| | | | d1 3.00 | N1 1.5168 | v1 64.2 |
| | r2 | −1002.54 | | | |
| | | | d2 1.00 | | |
| | r3 | 47.69 | | | |

TABLE 1-continued (1st Embodiment)

F = 185.8 to 210.0, β = −0.5 to −2.0, f − number = 8.0

| | | Radius of Curvature | | Axial Distance | Refractive Index | | Abbe Number |
|---|---|---|---|---|---|---|---|
| 2 | r4 | 398.98 | d3 | 6.10 | N2 1.7200 | v2 | 52.1 |
| | r5 | −152.08 | d4 | 5.50 | | | |
| | r6 | 42.71 | d5 | 4.20 | N3 1.6545 | v3 | 33.9 |
| | Aperture Stop S | | d6 | 5.77 | | | |
| | | | d6' | 0.50 | | | |
| | r7 | 81.04 | d7 | 5.00 | N4 1.7570 | v4 | 47.7 |
| | r8 | −105.55 | d8 | 1.00 | | | |
| 3 | r9 | 210.00 | d9 | 3.00 | N5 1.5168 | v5 | 64.2 |
| | r10 | 80.85 | | | | | |

TABLE 2

| β | d2 | d4 | d8 |
|---|---|---|---|
| −0.5 | 19.16 | 6.26 | 4.78 |
| −0.707 | 5.43 | 5.69 | 1.92 |
| −1.0 | 1.00 | 5.50 | 1.00 |
| −1.414 | 2.37 | 5.39 | 4.77 |
| −2.0 | 6.63 | 5.04 | 16.50 |

TABLE 3

(2nd Embodiment)

F = 185.0 to 209.2, β = −0.5 to −2.0, f − number = 8.0

| | | Radius of Curvature | | Axial Distance | Refraction Index | | Abbe Number |
|---|---|---|---|---|---|---|---|
| 1 | r1 | −172.29 | d1 | 3.8 | N1 1.5168 | v1 | 64.2 |
| | r2 | ∞ | d2 | 1.0 | | | |
| | r3 | 47.40 | d3 | 8.3 | N2 1.6910 | v2 | 54.8 |
| | r4 | 223.75 | d4 | 5.2 | | | |
| 2 | r5 | −135.51 | d5 | 3.7 | N3 1.6259 | v3 | 35.7 |
| | r6 | 44.08 | d6 | 5.0 | | | |
| | Aperture Stop S | | d6' | 0.5 | | | |
| | r7 | 83.42 | d7 | 4.9 | N4 1.7725 | v4 | 49.8 |
| | r8 | −102.52 | d8 | 1.6 | | | |
| 3 | r9 | 200.23 | d9 | 3.6 | N5 1.5168 | v5 | 64.2 |
| | r10 | 88.47 | | | | | |

TABLE 4

| β | d2 | d4 | d8 |
|---|---|---|---|
| −0.5 | 21.12 | 6.37 | 5.86 |
| −0.707 | 5.89 | 5.49 | 2.64 |
| −1.0 | 1.00 | 5.20 | 1.60 |
| −1.414 | 2.52 | 5.09 | 6.26 |
| −2.0 | 7.36 | 4.76 | 21.11 |

TABLE 5

(3rd Embodiment)

F = 183.7 to 208.0, β = −0.5 to −2.0, f − number = 8.0

| | | Radius of Curvature | | Axial Distance | Refractive Index | | Abbe Number |
|---|---|---|---|---|---|---|---|
| 1 | r1 | −150.00 | d1 | 3.50 | N1 1.5182 | v1 | 59.0 |

TABLE 5-continued (3rd Embodiment)

F = 183.7 to 208.0, β = −0.5 to −2.0, f − number = 8.0

| | | Radius of Curvature | | Axial Distance | Refractive Index | | Abbe Number |
|---|---|---|---|---|---|---|---|
| | r2 | −547.05 | d2 | 1.00 | | | |
| | r3 | 43.30 | d3 | 8.20 | N2 1.6910 | v2 | 54.8 |
| | r4 | 104.81 | d4 | 4.70 | | | |
| 2 | r5 | −141.44 | d5 | 2.50 | N3 1.5927 | v3 | 35.4 |
| | r6 | 42.07 | d6 | 3.94 | | | |
| | Aperture Stop S | | d6' | 0.50 | | | |
| | r7 | 79.55 | d7 | 4.50 | N4 1.7435 | v4 | 49.2 |
| | r8 | −95.70 | d8 | 3.50 | | | |
| 3 | r9 | 202.33 | d9 | 3.50 | N5 1.5168 | v5 | 64.2 |
| | r10 | 101.65 | | | | | |

TABLE 6

| β | d2 | d4 | d8 |
|---|---|---|---|
| −0.5 | 25.75 | 5.28 | 12.37 |
| −0.707 | 7.01 | 4.84 | 5.65 |
| −1.0 | 1.00 | 4.70 | 3.50 |
| −1.414 | 3.25 | 4.57 | 9.88 |
| −2.0 | 10.30 | 4.17 | 29.81 |

TABLE 7

(4th Embodiment)

F = 186.8 to 211.0, β = −0.5 to −2.0, f − number = 8.0

| | | Radius of Curvature | | Axial Distance | Refractive Index | | Abbe Number |
|---|---|---|---|---|---|---|---|
| 1 | r1 | −133.12 | d1 | 3.5 | N1 1.5182 | v1 | 59.0 |
| | r2 | −881.95 | d2 | 1.0 | | | |
| | r3 | 47.80 | d3 | 6.3 | N2 1.7130 | v2 | 53.9 |
| | r4 | 204.01 | d4 | 5.7 | | | |
| 2 | r5 | −179.59 | d5 | 4.5 | N3 1.6398 | v3 | 34.6 |
| | r6 | 42.38 | d6 | 4.2 | | | |
| | Aperture Stop S | | d6' | 0.5 | | | |
| | r7 | 74.51 | d7 | 5.0 | N4 1.7883 | v4 | 47.3 |
| | r8 | −113.97 | d8 | 2.0 | | | |
| 3 | r9 | 240.55 | d9 | 3.0 | N5 1.5168 | v5 | 64.2 |
| | r10 | 89.52 | | | | | |

TABLE 8

| β | d2 | d4 | d8 |
|---|---|---|---|
| −0.5 | 18.79 | 6.64 | 5.75 |
| −0.707 | 5.33 | 5.93 | 2.91 |
| −1.0 | 1.00 | 5.70 | 2.00 |
| −1.414 | 2.31 | 5.70 | 5.93 |
| −2.0 | 6.38 | 5.70 | 18.14 |

TABLE 9

(5th Embodiment)
F = 185.7 to 210.0, β = −0.5 to −2.0, f − number = 9.0

| | Radius of Curvature | Axial Distance | Refractive Index | Abbe Number |
|---|---|---|---|---|
| 1 | r1 41.64 | d1 5.8 | N1 1.7080 | υ1 53.2 |
| | r2 105.47 | | | |
| | | d2 6.0 | | |
| 2 | r3 −215.95 | d3 2.6 | N2 1.6129 | υ2 37.0 |
| | r4 39.98 | | | |
| | | d4 7.3 | | |
| | Aperture Stop S | | | |
| | | d4′ 3.2 | | |
| 3 | r5 86.43 | d5 5.0 | N3 1.6968 | υ3 56.5 |
| | r6 −102.92 | | | |
| | | d6 2.0 | | |
| 4 | r7 234.51 | d7 3.0 | N4 1.5173 | υ4 69.4 |
| | r8 79.16 | | | |

TABLE 10

| β | d2 | d4′ | d6 |
|---|---|---|---|
| −0.5 | 6.62 | 4.00 | 16.75 |
| −0.707 | 6.15 | 3.39 | 5.55 |
| −1.0 | 6.00 | 3.20 | 2.00 |
| −1.414 | 6.00 | 3.42 | 5.75 |
| −2.0 | 6.00 | 4.11 | 17.55 |

TABLE 11

(6th Embodiment)
F = 185.6 to 210.0, β = −0.5 to −2.0, f − number = 9.0

| | Radius of Curvature | Axial Distance | Refractive Index | Abbe Number |
|---|---|---|---|---|
| 1 | r1 46.49 | d1 9.0 | N1 1.7650 | υ1 46.3 |
| | r2 175.56 | | | |
| | | d2 4.0 | | |
| 2 | r3 −301.82 | d3 3.4 | N2 1.6545 | υ2 33.9 |
| | r4 40.60 | | | |
| | | d4 9.4 | | |
| | Aperture Stop S | | | |
| | | d4′ 6.6 | | |
| 3 | r5 89.22 | d5 6.0 | N3 1.6700 | υ3 57.1 |
| | r6 −110.95 | | | |
| | | d6 1.0 | | |
| 4 | r7 242.54 | d7 3.0 | N4 1.5168 | υ4 64.2 |
| | r8 72.17 | | | |

TABLE 12

| β | d2 | d4′ | d6 |
|---|---|---|---|
| −0.5 | 4.76 | 7.61 | 12.63 |
| −0.707 | 4.18 | 6.84 | 3.80 |
| −1.0 | 4.00 | 6.60 | 1.00 |
| −1.414 | 4.00 | 6.81 | 4.21 |
| −2.0 | 4.00 | 7.45 | 14.34 |

TABLE 13

(7th Embodiment)
F = 185.5 to 210.0, β = −0.5 to −2.0, f-number = 9.0

| | Radius of Curvature | Axial Distance | Refractive Index | Abbe Number |
|---|---|---|---|---|
| 1 | r1 45.05 | d1 7.5 | N1 1.7810 | υ1 44.6 |
| | r2 123.69 | | | |
| | | d2 5.0 | | |
| | r3 −315.00 | | | |

TABLE 13-continued (7th Embodiment)
F = 185.5 to 210.0, β = −0.5 to −2.0, f-number = 9.0

| | Radius of Curvature | Axial Distance | Refractive Index | Abbe Number |
|---|---|---|---|---|
| 2 | r4 42.65 | d3 2.8 | N2 1.6830 | υ2 32.1 |
| | | d4 7.9 | | |
| | Aperture Stop S | | | |
| | | d4′ 5.0 | | |
| 3 | r5 100.13 | d5 7.0 | N3 1.6910 | υ3 54.8 |
| | r6 −104.94 | | | |
| | | d6 1.9 | | |
| 4 | r7 250.00 | d7 3.5 | N4 1.5173 | υ4 69.4 |
| | r8 86.25 | | | |

TABLE 14

| β | d2 | d4′ | d6 |
|---|---|---|---|
| −0.5 | 5.86 | 6.55 | 17.54 |
| −0.707 | 5.21 | 5.37 | 5.67 |
| −1.0 | 5.00 | 5.00 | 1.90 |
| −1.414 | 5.00 | 5.28 | 6.29 |
| −2.0 | 5.00 | 6.17 | 20.17 |

TABLE 15

(8th Embodiment)
F = 185.5 to 210.0, β = −0.5 to −2.0, f- = 9.0

| | Radius of Curvature | Axial Distance | Refractive Index | Abbe Number |
|---|---|---|---|---|
| 1 | r1 44.77 | d1 10.0 | N1 1.7170 | υ1 47.9 |
| | r2 141.86 | | | |
| | | d2 3.8 | | |
| 2 | r3 −257.04 | d3 2.4 | N2 1.6398 | υ2 34.6 |
| | r4 41.83 | | | |
| | | d4 6.7 | | |
| | Aperture Stop S | | | |
| | | d4′ 7.3 | | |
| 3 | r5 101.59 | d5 6.3 | N3 1.6968 | υ3 56.5 |
| | r6 −108.62 | | | |
| | | d6 2.0 | | |
| 4 | r7 250.00 | d7 3.5 | N4 1.5168 | υ4 64.2 |
| | r8 84.03 | | | |

TABLE 16

| β | d2 | d4 | d4′ | d6 |
|---|---|---|---|---|
| −0.5 | 4.91 | 13.62 | 3.15 | 15.05 |
| −0.707 | 4.07 | 8.37 | 6.30 | 5.15 |
| −1.0 | 3.80 | 6.70 | 7.30 | 2.00 |
| −1.414 | 3.80 | 7.16 | 6.84 | 6.56 |
| −2.0 | 3.80 | 8.61 | 6.51 | 21.14 |

TABLE 17

(9th Embodiment)
F = 194.0 to 220.0, β = −0.5 to −2.0, f-number = 9.0

| | Radius of Curvature | Axial Distance | Refractive Index | Abbe Number |
|---|---|---|---|---|
| 1 | r1 46.71 | d1 11.00 | N1 1.7170 | υ1 47.9 |
| | r2 147.33 | | | |
| | | d2 4.00 | | |
| 2 | r3 −280.00 | d3 2.50 | N2 1.6398 | υ2 34.6 |
| | r4 43.23 | | | |
| | | d4 7.00 | | |
| | Aperture Stop S | | | |
| | | d4′ 8.65 | | |

TABLE 17-continued (9th Embodiment)
F = 194.0 to 220.0, β = −0.5 to −2.0, f-number = 9.0

| | Radius of Curvature | Axial Distance | Refractive Index | Abbe Number |
|---|---|---|---|---|
| | r5  105.50 | | | |
| | | d5  6.50 | N3 1.6968 | ν3 56.5 |
| | r6 −113.29 | | | |
| | | d6  2.50 | | |
| 3 | r7  280.00 | | | |
| | | d7  3.50 | N4 1.5168 | ν4 64.2 |
| | r8   88.03 | | | |

TABLE 18

| β | d2 | d6 |
|---|---|---|
| −0.5 | 5.01 | 19.40 |
| −0.707 | 4.24 | 6.54 |
| −1.0 | 4.00 | 2.50 |
| −1.414 | 3.85 | 7.39 |
| −2.0 | 3.38 | 23.05 |

TABLE 19

(10th Embodiment)
F = 194.1 to 220.0, β = −0.5 to −2.0, f-number = 9.0

| | Radius of Curvature | Axial Distance | Refractive Index | Abbe Number |
|---|---|---|---|---|
| 1 | r1   46.82 | | | |
| | | d1  7.90 | N1 1.7810 | ν1 44.6 |
| | r2  124.39 | | | |
| | | d2  5.10 | | |
| | r3 −330.00 | | | |
| | | d3  3.00 | N2 1.6727 | ν2 32.2 |
| | r4   43.83 | | | |
| | | d4  8.30 | | |
| 2 | Aperture Stop S | | | |
| | | d4′ 5.25 | | |
| | r5  100.18 | | | |
| | | d5  7.00 | N3 1.6910 | ν3 54.8 |
| | r6 −108.73 | | | |
| | | d6  1.80 | | |
| 3 | r7  261.91 | | | |
| | | d7  3.80 | N4 1.5176 | ν4 69.4 |
| | r8   86.15 | | | |

TABLE 20

| β | d2 | d6 |
|---|---|---|
| −0.5 | 5.96 | 18.91 |
| −0.707 | 5.31 | 5.89 |
| −1.0 | 5.10 | 1.80 |
| −1.414 | 4.96 | 6.63 |
| −2.0 | 4.50 | 22.10 |

TABLE 21

| | 1st Embodiment | 2nd Embodiment | 3rd Embodiment | 4th Embodiment |
|---|---|---|---|---|
| $\frac{F2}{F}$ | 0.44 | 0.47 | 0.52 | 0.44 |
| $\frac{F1}{F3}$ | 1.26 | 1.08 | 1.00 | 1.09 |
| $\frac{r1}{F1}$ | 0.44 | 0.52 | 0.26 | 0.44 |
| $\left|\frac{r10}{F3}\right|$ | 0.32 | 0.29 | 0.25 | 0.32 |
| ν1 | 64.2 | 64.2 | 59.0 | 59.0 |
| ν2 | 64.2 | 64.2 | 64.2 | 64.2 |

TABLE 21-continued

| | 1st Embodiment | 2nd Embodiment | 3rd Embodiment | 4th Embodiment |
|---|---|---|---|---|
| $\frac{f2}{F2}$ | 0.81 | 0.94 | 0.87 | 0.93 |
| $\frac{f3 + f4}{F}$ | 0.12 | 0.08 | 0.04 | 0.05 |

TABLE 22

| | 5th Embodiment | 6th Embodiment | 7th Embodiment | 8th Embodiment |
|---|---|---|---|---|
| $\frac{f123}{f}$ | 0.56 | 0.53 | 0.59 | 0.58 |
| $\left|\frac{f4}{f}\right|$ | 1.11 | 0.95 | 1.26 | 1.18 |

TABLE 23

| | 9th Embodiment | 10th Embodiment |
|---|---|---|
| $\frac{f123}{f}$ | 0.57 | 0.57 |
| $\left|\frac{f4}{f}\right|$ | 1.14 | 1.14 |

What is claimed is:

1. A zoom lens system for use in a copying apparatus, comprising from the object side:

a first lens unit of a negative power including a first lens element of a negative power strongly concave to the object side;

a second lens unit of a positive power including a second lens element which is a positive meniscus lens element convex to the object side, a third lens element which is a bi-concave lens element whose object side surface has a larger radius of curvature and a fourth lens element which is a bi-convex lens element, said second lens unit being overall positive and a distance between said second and third lens elements slightly varying; and a third-lens unit of a negative power including a fifth lens element which is a negative meniscus lens element concave to the image side, wherein the following conditions are fulfilled:

$$0.4 < \frac{F2}{F} < 0.6$$

$$0.95 < \frac{F1}{F3} < 1.35$$

where F represents a focal length of the entire lens system at a magnification of −1×, F1 represents a focal length of the first lens unit at a magnification of −1×, F2 represents a focal length of the second lens unit at a magnification of −1× and F3 represents a focal length of the third lens unit at a magnification of −1×, and wherein zooming is performed while a conjugate distance is kept constant by moving the entire lens system along the optical axis while:

varying a distance between the first and second lens units and a distance between the second and third lens units so that the following conditions are fulfilled:

$$\Delta d2 < \Delta d8 \text{ when } |\beta| > 1$$

$$\Delta d2 > \Delta d8 \text{ when } |\beta| < 1$$

where $\Delta d2$ represents a variation amount of the distance between the first and second lens units during zooming, $\Delta d8$ represents a variation amount of the distance between the second and third lens units during zooming and $\beta$ represents a magnification; and varying, at least either at a magnification larger than unity or at a magnification smaller than unity, a distance between the second and third lens elements of the second lens unit so that the following conditions are fulfilled:

$$d4 < d4' \text{ when } |\beta| > 1$$

$$d4 > d4' \text{ when } |\beta| < 1$$

where d4 represents the distance between the second and third lens elements at unity magnification and d4' represents the distance between the second and third lens elements at a magnification other than unity.

2. A zoom lens system for use in a copying apparatus as claimed in claim 1, wherein the following conditions are further fulfilled:

$$0.2 < \frac{r1}{F1} < 0.6$$

$$0.2 < \left|\frac{r10}{F3}\right| < 0.4$$

$$\nu 1, \nu 2 > 50$$

$$0.7 < \frac{f2}{F2} < 1.0$$

$$0.03 < \frac{f3 + f4}{F2} < 0.13$$

where r1 represents a radius of curvature of a first surface, r10 represents a radius of curvature of a tenth surface, $\nu 1$ represents an Abbe number of the first lens element, $\nu 2$ represents an Abbe number of the second lens element, and f2 represents a focal length of the second lens element.

3. A zoom lens system for use in a copying apparatus, comprising from the object side:

a first lens unit including a first lens element which is a positive meniscus lens element convex to the object side;

a second lens unit including a second lens element which is a bi-concave lens element whose object side surface has a larger radius of curvature;

a third lens unit including a third lens element which is a bi-convex lens element; and a fourth lens unit including a fourth lens element which is a negative meniscus lens element concave to the image side, wherein zooming is performed by moving the entire lens system along the optical axis while varying, during zooming to a magnification larger than unity, at least a distance between the second and third lens elements and a distance between the third and fourth lens elements so as to be larger than the distances therebetween obtained at unity magnification and varying, during zooming to a magnification smaller than unity, distances between all the lens elements so as to be larger than the distances therebetween obtained at unity magnification, and wherein during zooming, the following conditions are fulfilled:

$$\Delta d2 < \Delta d4 < \Delta d6$$

where $\Delta d2$ represents a variation amount of a distance between the first and second lens elements from the distance therebetween obtained at unity magnification, $\Delta d4$ represents a variation amount of the distance between the second and third lens elements from the distance therebetween obtained at unity magnification, and $\Delta d6$ represents a variation amount of the distance between the third and fourth lens elements from the distance therebetween obtained at unity magnification.

4. A zoom lens system for use in a copying apparatus as claimed in claim 3, wherein the following conditions are further fulfilled:

$$0.45 < \frac{f123}{f} < 0.65$$

$$0.8 < \left|\frac{f4}{f}\right| < 1.4$$

$$\nu 4 > 50$$

where f123 represents a composite focal length of the first, second and third lens elements at unity magnification, f represents a focal length of the entire lens system at unity magnification, f4 represents a focal length of the fourth lens element and $\nu 4$ represents an Abbe number of the fourth lens element.

5. A zoom lens system for use in a copying apparatus, comprising from the object side:

a first lens unit including a first lens element which is a positive meniscus lens element convex to the object side;

a second lens unit including a second lens element which is a bi-concave lens element whose object side surface has a larger radius of curvature and a third lens element which is a bi-convex lens element; and a third lens unit including a fourth lens element which is a negative meniscus lens element concave to the image side, wherein zooming is performed while a conjugate distance is kept constant by moving the entire lens system along the optical axis while varying a distance between the first and second lens units and a distance between the second and third lens units, and wherein the following conditions are fulfilled:

$$d2' < d2 \text{ when } |\beta| > 1$$
$$d2' > d2 \text{ when } |\beta| < 1$$

$$|\Delta d2| < \Delta d6$$

where d2 represents a distance between the first and second lens units at unity magnification, d2' represents a distance between the second and third lens unit at magnifications other than unity, $\Delta d2$ represents a variation amount of the distance between the first and second lens units during zooming and $\Delta d6$ represents a variation amount of the distance between the second and third lens units during zooming.

6. A zoom lens system for use in a copying apparatus as claimed in claim 5, wherein the following conditions are further fulfilled:

$$0.45 < \frac{f123}{f} < 0.65$$

$$0.8 < \left|\frac{f4}{f}\right| < 1.4$$

$$\nu 4 > 50$$

where f123 represents a composite focal length of the first, second and third lens elements at unity magnification, f represents a focal length of the entire lens system at unity magnification, f4 represents a focal length of the fourth lens element and $\nu 4$ represents an Abbe number of the fourth lens element.

* * * * *